(12) United States Patent
Haubs et al.

(10) Patent No.: US 8,354,495 B2
(45) Date of Patent: Jan. 15, 2013

(54) PROCESS FOR THE PREPARATION OF OXYMETHYLENE POLYMERS AND APPARATUS SUITABLE FOR THIS PURPOSE

(75) Inventors: Michael Haubs, Bad Kreuznach (DE); Eberhard Mann, Heusenstamm (DE); Jürgen Lingnau, Mainz-Laubenheim (DE)

(73) Assignee: Ticona GmbH, Kelsterbach (DE)

( * ) Notice: Subject to any disclaimer, the term of this patent is extended or adjusted under 35 U.S.C. 154(b) by 663 days.

(21) Appl. No.: 12/423,653

(22) Filed: Apr. 14, 2009

(65) Prior Publication Data

US 2009/0264615 A1    Oct. 22, 2009

Related U.S. Application Data

(60) Provisional application No. 61/045,319, filed on Apr. 16, 2008.

(30) Foreign Application Priority Data

Apr. 16, 2008   (DE) .................. 10 2008 018 966

(51) Int. Cl.
  *C08G 65/34*   (2006.01)
(52) U.S. Cl. ........................................ 528/425
(58) Field of Classification Search ............. 528/425
  See application file for complete search history.

(56) References Cited

U.S. PATENT DOCUMENTS

| | | | |
|---|---|---|---|
| 3,161,616 A | | 12/1964 | Brown et al. |
| 3,161,617 A | * | 12/1964 | Wagner et al. ............. 528/243 |
| 3,269,988 A | | 8/1966 | Braude et al. |
| 3,340,234 A | * | 9/1967 | Schweitzer et al. ......... 525/400 |
| 3,380,966 A | * | 4/1968 | Fouts ............................ 525/410 |
| 3,393,179 A | | 7/1968 | Leverett et al. |
| 3,998,791 A | | 12/1976 | Radici et al. |

(Continued)

FOREIGN PATENT DOCUMENTS

CN    1180713 A    5/1998

(Continued)

OTHER PUBLICATIONS

Product Data Sheets for Lucel grades N109-02, N109-LD, N109-WR, 1 page.

(Continued)

*Primary Examiner* — James J Seidleck
*Assistant Examiner* — Peter A Salamon
(74) *Attorney, Agent, or Firm* — Dority & Manning, P.A.

(57) ABSTRACT

Process for the preparation of oxymethylene polymers and apparatus suitable for this purpose A process and an apparatus for the preparation of oxymethylene polymers is described. The process encompasses the polymerization of a monomer that forms oxymethylene groups, if appropriate in the presence of a cyclic acetal, together with an acetal of formaldehyde and with an initiator for cationic polymerization, preferably in a gas-tight kneader or extruder. The temperature profile of the polymerization here is designed in such a way that the polymerization mixture, which is initially heterogeneous by virtue of precipitating polymer, is converted to a homogeneous phase at the end of the polymerization. The homogeneous phase in which the polymer is present in liquid form is stabilized via addition of deactivators.

Figure 1:
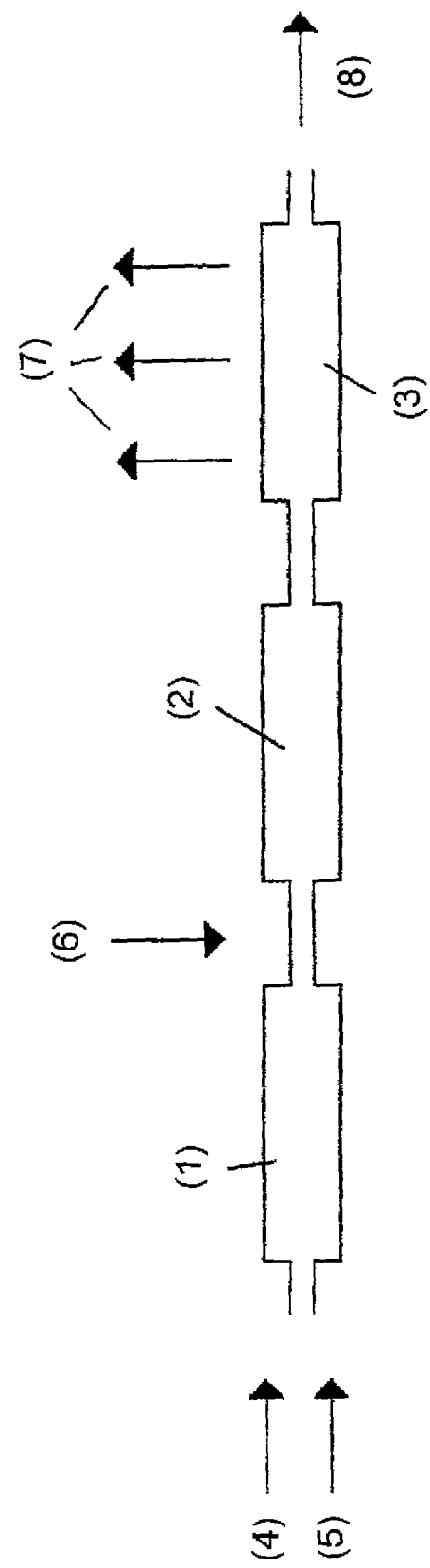

After removal of volatile constituents, oxymethylene polymers are obtained with high thermal stability and with good mechanical properties.

The oxymethylene polymers can be prepared at low energy cost and their properties can be adjusted as desired via prescription of the temperature profile during the polymerization.

10 Claims, 2 Drawing Sheets

U.S. PATENT DOCUMENTS

| | | | |
|---|---|---|---|
| 4,097,453 | A | 6/1978 | Radici et al. |
| 4,431,794 | A | 2/1984 | Sadlowski et al. |
| 4,493,751 | A | 1/1985 | Cherdron et al. |
| 4,517,319 | A | 5/1985 | Reske et al. |
| 5,039,741 | A | 8/1991 | Burg et al. |
| 5,144,005 | A | 9/1992 | Sextro et al. |
| 5,183,860 | A | 2/1993 | Kashihara |
| 5,248,762 | A | 9/1993 | Yamamoto et al. |
| 5,344,911 | A | 9/1994 | Yamamoto et al. |
| 5,506,332 | A | 4/1996 | Funhoff et al. |
| 5,541,284 | A | 7/1996 | Arnoldi et al. |
| 5,587,449 | A * | 12/1996 | Fleischer et al. .............. 528/232 |
| 5,608,030 | A * | 3/1997 | Hoffmockel et al. ......... 528/232 |
| 5,688,897 | A | 11/1997 | Tanimura et al. |
| 5,726,276 | A | 3/1998 | Nakai et al. |
| 5,728,798 | A | 3/1998 | Nakai et al. |
| 5,756,594 | A | 5/1998 | Funhoff et al. |
| 5,811,511 | A | 9/1998 | Tanigawa et al. |
| 5,837,781 | A | 11/1998 | Tanimura et al. |
| 5,844,059 | A | 12/1998 | Yamamoto et al. |
| 5,866,670 | A | 2/1999 | Nakai et al. |
| 5,886,139 | A | 3/1999 | Yamamoto et al. |
| 5,929,195 | A | 7/1999 | Kawaguchi et al. |
| 5,942,595 | A | 8/1999 | Adelman et al. |
| 5,948,841 | A | 9/1999 | Nakamura |
| 5,959,036 | A | 9/1999 | Yahiro et al. |
| 6,037,439 | A | 3/2000 | Serizawa et al. |
| 6,139,804 | A | 10/2000 | Tanigawa et al. |
| 6,255,440 | B1 | 7/2001 | Okawa et al. |
| 6,365,655 | B1 | 4/2002 | Tanimura et al. |
| 6,388,049 | B1 * | 5/2002 | Yokoyama et al. ........... 528/425 |
| 6,399,699 | B1 | 6/2002 | Tanigawa et al. |
| 6,426,393 | B1 | 7/2002 | Tajima et al. |
| 6,433,128 | B2 | 8/2002 | Nakamura et al. |
| 6,506,838 | B1 | 1/2003 | Seyama |
| 6,506,850 | B1 | 1/2003 | Tanimura et al. |
| 6,576,740 | B1 | 6/2003 | Chin et al. |
| 6,617,416 | B2 | 9/2003 | Nakamura et al. |
| 6,753,368 | B2 | 6/2004 | Okawa et al. |
| 6,756,475 | B2 | 6/2004 | Mours et al. |
| 6,777,487 | B2 | 8/2004 | Niino et al. |
| 7,064,177 | B2 | 6/2006 | Gortz et al. |
| 7,112,651 | B2 | 9/2006 | Gortz et al. |
| 7,414,159 | B2 | 8/2008 | Stroefer et al. |
| 7,476,718 | B2 | 1/2009 | Blair |
| 7,598,339 | B2 | 10/2009 | Schwittay et al. |
| 7,645,822 | B2 | 1/2010 | Assmann et al. |
| 7,812,110 | B2 * | 10/2010 | Haubs et al. .................. 528/230 |
| 7,816,433 | B2 | 10/2010 | Komatsu et al. |
| 7,863,393 | B2 | 1/2011 | Assmann et al. |
| 7,897,672 | B2 | 3/2011 | Nagai et al. |
| 7,906,609 | B2 | 3/2011 | Blinzler et al. |
| 7,928,184 | B2 | 4/2011 | Harashina et al. |
| 2005/0255990 | A1 | 11/2005 | Luinstra |
| 2006/0235119 | A1 | 10/2006 | Schmalz et al. |
| 2006/0252912 | A1 * | 11/2006 | Hoffmockel et al. ......... 528/425 |
| 2007/0179273 | A1 * | 8/2007 | Haubs et al. .................. 528/425 |
| 2007/0185308 | A1 * | 8/2007 | Haubs et al. .................. 528/425 |
| 2008/0097077 | A1 | 4/2008 | Assmann et al. |
| 2008/0214748 | A1 * | 9/2008 | Assmann et al. ............... 526/68 |
| 2008/0234459 | A1 | 9/2008 | Lang et al. |
| 2008/0271381 | A1 | 11/2008 | Harashina et al. |
| 2010/0004409 | A1 | 1/2010 | Schwittay et al. |

FOREIGN PATENT DOCUMENTS

| | | | |
|---|---|---|---|
| CN | 1180714 | A | 5/1998 |
| CN | 1191226 | A | 8/1998 |
| CN | 1251799 | A | 5/2000 |
| CN | 101472967 | A | 7/2009 |
| CN | 101525404 | A | 9/2009 |
| DE | 1 158 709 | | 12/1963 |
| DE | 1 445 255 | | 11/1968 |
| DE | 2 263 300 | A1 | 7/1974 |
| DE | 2947490 | A | 6/1981 |
| DE | 31 47 309 | A1 | 6/1983 |
| DE | 37 03 790 | A1 | 8/1988 |
| DE | 44 36 107 | A1 | 4/1996 |
| DE | 195 81 345 | C2 | 12/1996 |
| EP | 0 000 765 | A1 | 2/1979 |
| EP | 0 080 656 | A | 6/1983 |
| EP | 0 108 324 | A | 5/1984 |
| EP | 0 115846 | A2 | 8/1984 |
| EP | 0 137 305 | A2 | 4/1985 |
| EP | 0 156285 | A2 | 10/1985 |
| EP | 0 397492 | A2 | 11/1990 |
| EP | 0 397493 | A2 | 11/1990 |
| EP | 0 397494 | A2 | 11/1990 |
| EP | 0 398585 | A2 | 11/1990 |
| EP | 0 400827 | A2 | 12/1990 |
| EP | 0 504 405 | A1 | 9/1992 |
| EP | 0 629 644 | A2 | 12/1994 |
| EP | 0 673955 | A2 | 9/1995 |
| EP | 0 716 105 | A2 | 6/1996 |
| EP | 0 999224 | A | 5/2000 |
| EP | 2 050 774 | A1 | 4/2009 |
| GB | 1 524 440 | A | 9/1978 |
| GB | 1524410 | A | 9/1978 |
| JP | 4/114003 | A | 4/1992 |
| JP | 4/145114 | | 5/1992 |
| JP | 5/59255 | | 3/1993 |
| JP | 7233230 | A | 9/1995 |
| JP | 7286023 | A | 10/1995 |
| JP | 2000119357 | A | 4/2000 |
| JP | 2000129080 | A | 5/2000 |
| JP | 2002097240 | A | 4/2002 |
| JP | 2003105048 | A | 4/2003 |
| JP | 2006249445 | A | 9/2006 |
| WO | WO 97/24384 | A1 | 7/1997 |
| WO | WO 03/046035 | A1 | 6/2003 |
| WO | WO 2004/065444 | A1 | 8/2004 |
| WO | WO 2005/012380 | A1 | 2/2005 |
| WO | WO 2005/033183 | A1 | 4/2005 |
| WO | WO 2006/050869 | A1 | 5/2006 |
| WO | WO 2006/058679 | A1 | 6/2006 |
| WO | WO 2006/077055 | A1 | 7/2006 |
| WO | WO 2006/082196 | a1 | 8/2006 |
| WO | WO 2006/089915 | A1 | 8/2006 |
| WO | WO 2006/097486 | A1 | 9/2006 |
| WO | WO 2006/105918 | A1 | 10/2006 |
| WO | WO 2006/120199 | A1 | 11/2006 |
| WO | WO 2006/120218 | A1 | 11/2006 |
| WO | WO 2006/134121 | A1 | 12/2006 |
| WO | WO 2007/036476 | A1 | 4/2007 |
| WO | WO 2007/073873 | A1 | 7/2007 |
| WO | WO 2007/073874 | A1 | 7/2007 |
| WO | WO 2009/027434 | A2 | 3/2009 |

OTHER PUBLICATIONS

"Impact Modification of Polyacetal by Thermoplastic Elastomer Polyurethane", Mehrabzadeh, M.; Rezaie, D.; Journal of Applied Polymer Science, 2002, p. 2573-2582.

Penczek, et al., Cationic Ring-Opening Polymerization, p. 122.

International Search Report for PCT/EP2009/002712 Dated Aug. 3, 2009.

International Search Report for PCT/EP2009/002713 Dated Aug. 3, 2009.

* cited by examiner

PROCESS FOR THE PREPARATION OF OXYMETHYLENE POLYMERS AND APPARATUS SUITABLE FOR THIS PURPOSE

RELATED APPLICATIONS

The present application is based on and claims priority to United States Provisional Patent Application No. 61/045,319, filed on Apr. 16, 2008 and claims priority to or the benefit of German Patent Application No. 102008018966.9-44, filed on Apr. 16, 2008.

The present invention relates to an improved process for the preparation of oxymethylene polymers, and also to an apparatus suitable for this purpose.

The preparation of polyoxymethylenes is known per se. It can firstly take place via anionic polymerization of anhydrous formaldehyde and secondly it can take place via the cationic polymerization of formaldehyde or of cyclic oligomers of formaldehyde, mostly trioxane. The polymerization here can take place either in bulk (i.e. without solvent) or else in solution in the form of a precipitation polymerization, or else in the melt in a homogeneous phase, under pressure (cf., for example, DE 31 47 309 A1).

A disadvantage of the polymerization using cationic initiators is that these also catalyze side-reactions, such as the hydride shift, which leads to molecular-weight degradation and to formation of formate end groups. (See, for example, Penczek et al., Cationic Ring Opening Polymerization in: Advances in Polymer Science No. 68/69, p. 122). After polymerization, the reaction mixture therefore has to be rapidly and completely deactivated. This is typically achieved via addition of deactivators, e.g. bases, to the polymerization mixture.

This addition can take place in an aqueous phase or in an organic solvent—mostly at an elevated temperature—with subsequent filtration, and then washing and drying. However, the deactivation can also take place in the melt (cf., for example, DE-A-3,703,790), and the resultant solid crude polymer here is first ground, residual monomers being drawn off during this process, and the crude polymer then being melted, and the resultant melt being mixed with the deactivator (e.g. amines or phosphines).

EP-A-673,955 describes a process in which the crude polymer is treated with a stream of vapor which comprises a volatile base. Deactivation using alkali metal oxides or using alkaline earth metal oxides in the melt is also described (cf. in this connection also JP-A-05/059,255). In all of the processes described for cationic precipitation polymerization, the crude polymer is first obtained in solid form and comminuted, and if appropriate heated, and then the deactivator is admixed. All of these processes are therefore relatively complicated.

EP-A-999,224 says that it is possible to omit a separate treatment with a deactivator if the initiators used comprise strong protonic acids at low concentration. It then becomes possible to carry out the stabilization, devolatilization, and compounding step (=addition of stabilizers, auxiliaries, fillers, reinforcing materials, and/or colorants) in a single step. The stabilizers, which are generally basic, thus also assume the deactivation function. Here again however, a solid crude polymer is prepared in a first step and is then mixed, melted, and pelletized with the abovementioned additives. This process is limited to copolymers, in particular those having relatively high content of stabilizing comonomers.

DE-A-3,147,309 describes an integrated approach in which oxymethylene polymers are prepared in the melt in a homogeneous phase, under pressure. In that process, the reaction of the monomers is carried out to completion and at comparatively high temperatures. A consequence of these temperatures, however, is that the side-reactions become more pronounced at the residence times required for the conversions. The result is lower molecular weights and more unstable end groups, which significantly lower the yields and/or make it impossible to achieve desired lower melt viscosities, particularly in the case of oxymethylene homo- and copolymers with low comonomer content.

FIG. 1 describes a preferred process

Figure 2:
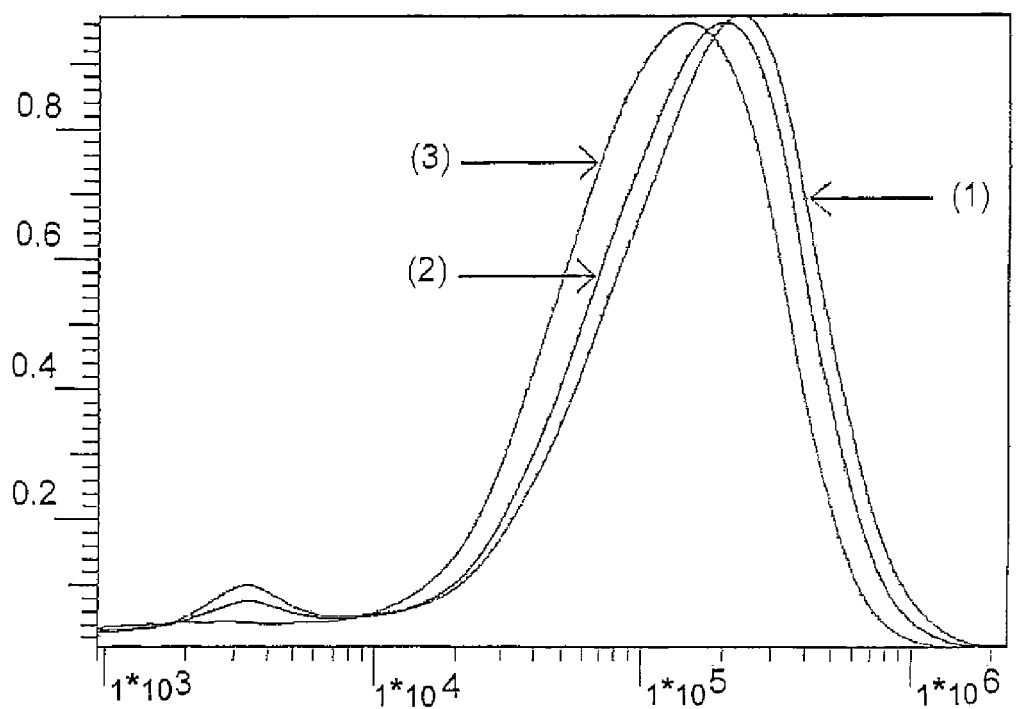

FIG. 2 shows the GPC curves of the polymers from examples 1-3.

It is an object of the present invention to provide a simple process for the preparation of oxymethylene polymers (also called "POM" hereinafter) of high stability, where the process can be carried out using simple means and at low energy cost, and also permits the synthesis of oxymethylene homo- and copolymers with low comonomer content, including those of low melt viscosities.

The present invention provides a process for the preparation of oxymethylene polymers via polymerization of at least one monomer that forms —$CH_2$—O— units, if appropriate in combination with at least one comonomer copolymerizable therewith having at least one C—C bond, and also in the presence of a chain transfer agent and of an initiator for cationic polymerization, which comprises carrying out the polymerization in a first phase in a heterogeneous polymerization mixture and, following this, in a second phase in a homogeneous polymerization mixture.

In one preferred embodiment, the inventive process encompasses the measures of:

i) polymerization of a monomer that forms —$CH_2$—O— units and which, if appropriate, comprises a cyclic acetal, such as, for example, dioxolane in the presence of a transfer agent and of an initiator for cationic polymerization, where the temperature of the polymerization mixture is so low that solid polymer is present alongside liquid monomer at the beginning of the polymerization, ii) raising of the temperature during the course of the polymerization sufficiently far that a substantially homogeneous polymer melt is present at the end of the polymerization alongside remaining residual monomers, iii) deactivation of the active polymer chains in a homogeneous phase, in that the polymer melt is brought into contact with a deactivator, and iv) if appropriate, direct further processing of the resultant melt via degradation of the unstable chain ends and devolatilization of the polymer melt.

In one preferred embodiment, the process takes place, at least in the homogeneous reaction step, in a sealed system, that is to say that the reaction takes place under the pressure generated by the monomers themselves, e.g. trioxane or formaldehyde.

The first phase of the inventive process, for example step i), is the known polymerization of monomers that form —$CH_2$—O— units, if appropriate in the presence of cyclic acetals, such as 1,3-dioxolane. The polymerization takes the form of a precipitation polymerization, and solid polymer is therefore present alongside monomer which has not yet been consumed. For this, a monomer that forms —$CH_2$—O— units, or a mixture of different monomers, is reacted using conventional initiators for cationic polymerization and using chain transfer agents, such as acetals of formaldehyde, as regulator, in a manner known per se. Typical temperatures are from 40° C. to 150° C. The polymerization preferably takes place at pressures of from 2 to 100 bar, preferably at pressures of from 5 to 40 bar.

The polymerization temperature in this first phase is sufficiently low that the polymer substantially precipitates in the reaction mixture, i.e. the reaction mixture is a heterogeneous solid/liquid mixture. The solid phase here is formed by precipitated polymer, while the liquid phase is in essence composed of as yet unconverted monomer. The polymerization conversion is from 10% to 70%, and a conveyable mixture is therefore present.

In the second phase of the inventive process, following the first phase, for example in step ii), the polymerization temperature rises in such a way that the heterogeneous solid/liquid mixture becomes substantially homogeneous. The temperature rise is brought about on the one hand via the heat of polymerization/crystallization, and on the other hand via heat supply from outside. This enables the polymerization to be carried out with a certain temperature profile. A controlled temperature profile permits adjustment as desired of some of the properties of the polymers, examples being impact resistance or modulus of elasticity, within certain limits. The controlled utilization of the heat of polymerization/crystallization permits efficient utilization of energy in this step of the process. On the other hand, it is also possible to achieve other temperature profiles for the purposes of the process via appropriate heating elements and cooling elements.

The temperature profile over the entire polymerization typically varies from 80° C. to 170° C., but can also run from 120° C. to 180° C. The temperature and residence time in the second phase are minimized, in order to suppress undesired side-reactions (hydride shift). Typical upper temperatures—as a function of comonomer content—are from 100° C. to 170° C., and this temperature or final temperature is to be adjusted according to the invention in such a way that the reaction mixture is substantially homogeneous, i.e. the polymer is molten.

At the end of the second phase of the inventive process, for example in step iii), to terminate the polymerization, the homogeneous, liquid reaction mixture, which can comprise, if appropriate, small amounts of solid constituents and which still comprises unconverted monomers, such as trioxane and formaldehyde, alongside polymer, is brought into contact with deactivators. These can be in bulk form or in a form diluted with an inert aprotic solvent when they are admixed with the polymerization mixture. The result is rapid and complete deactivation of the active chain ends. It has been found that the polymerization can be terminated even when the liquid polymerization mixture at the end of the polymerization is substantially, but not necessarily completely, molten. It is therefore possible to terminate the polymerization via addition of deactivators when the polymerization mixture still comprises from about 5 to 10% by weight of solid constituents.

The optional step iv) corresponds to the prior art in melt hydrolysis, except that the polymers can be introduced directly in the form of melt into the assemblies that follow.

In one preferred embodiment of the inventive process, operation in a sealed assembly permits the conduct of the reaction at temperatures above the boiling point of the monomers. This also leads to better yields in the polymerization, since the monomers cannot escape.

In one preferred embodiment, the first and second phase of the inventive process are carried out in a reactor which permits the generation of a superatmospheric pressure in the interior of the reactor during continuous introduction of reactants into the reactor and continuous discharge of materials from the reactor, and which possesses a plurality of mutually independently heatable zones. This reactor is also provided by the present invention.

This reactor is particularly preferably an extruder with pressure-retention valve which has connection to the outlet of the extruder.

For the preparation of the oxymethylene polymers, a monomer that forms —$CH_2$—O— units, or a mixture of different monomers, is reacted in the manner described above. Examples of monomers that form —$CH_2$—O— units are formaldehyde or its cyclic oligomers, such as 1,3,5-trioxane (trioxane) or 1,3,5,7-tetroxane.

The oxymethylene polymers are generally unbranched linear polymers which generally contain at least 80 mol %, preferably at least 90 mol %, in particular at least 95 mol %, of oxymethylene units (—$CH_2$—O—). Alongside these, the oxymethylene polymers contain —$(CH_2)_x$—O— units, where x can assume the values from 2 to 25. Small amounts of branching agents can be used if desired. Examples of branching agents used are alcohols whose functionality is three or higher, or their derivatives, preferably tri- to hexahydric alcohols or their derivatives. Preferred derivatives are formulas in which, respectively, two OH groups have been reacted with formaldehyde, and also epoxides. The amount of branching agents is usually not more than 1% by weight, based on the total amount of monomer used for the preparation of the oxymethylene polymers, preferably not more than 0.3% by weight.

The invention also encompasses the preparation of those oxymethylene polymers which can also contain hydroxyalkylene end groups —O—$(CH_2)_x$—OH, alongside methoxy end groups, where x can assume the values from 2 to 25. These polymers can be prepared by carrying out the polymerization in the presence of diols of the general formula HO—$(CH_2)_x$—OH, where x can assume the values from 2 to 25. The polymerization in the presence of the diols leads, via chain transfer, to polymers having hydroxyalkylene end groups. The concentration of the diols in the reaction mixture depends on the percentage of the end groups intended to be present in the form of —O—$(CH_2)_x$—OH, and is from 10 ppm by weight to 2 percent by weight.

The molecular weights of these polymers, expressed via the volume melt index MVR, can be adjusted within a wide range. The polymers typically have repeat structural units of the formula —$(CH_2$—O—$)_n$—, where n indicates the average degree of polymerization (number average) and preferably varies in the range from 500 to 10 000, in particular from 500 to 4000.

The inventively prepared oxymethylene polymers derive from formaldehyde or from its cyclic oligomers, such as trioxane or tetroxane.

It is preferable to prepare oxymethylene polymers in which at least 80%, preferably at least 90%, very particularly preferably at least 95%, of all of the end groups are alkyl ether groups, in particular methoxy or ethoxy groups. Oxymethylene polymers very particularly preferably prepared derive from trioxane.

Monomers that form —$CH_2$—O— units and whose use is particularly preferred are formaldehyde or, very particularly preferably, trioxane.

The molecular weight of the resultant homo- and copolymers can be adjusted via use of acetals of formaldehyde (chain transfer agents). These also lead to production of etherified end groups of the polymers, and a separate reaction with capping reagents can therefore be omitted.

Chain transfer agents used are monomeric or oligomeric acetals of formaldehyde.

Preferred chain transfer agents are compounds of the formula I

$$R^1-(O-CH_2)_q-O-R^2 \qquad (I),$$

in which $R^1$ and $R^2$, independently of one another, are monovalent organic radicals, preferably alkyl radicals, such as butyl, propyl, ethyl, and in particular methyl, and q is a whole number from 1 to 50.

Particularly preferred chain transfer agents are compounds of the formula I, in which q=1, very particularly preferably methylal.

The amounts used of the chain transfer agents are usually up to 5000 ppm, preferably from 100 to 3000 ppm, based on the monomer (mixture).

The initiators used can comprise the cationic initiators usually used in the preparation of oxymethylene homo- and copolymers. Examples of these are protic acids, e.g. fluorinated or chlorinated alkyl- and arylsulfonic acids, such as trifluoromethanesulfonic acid, trifluoromethanesulfonic anhydride, or Lewis acids, such as stannic tetrachloride, arsenic pentafluoride, phosphorus pentafluoride, and boron trifluoride, and also their complex compounds, e.g. boron trifluoride etherate, and carbocation sources, such as triphenylmethyl hexafluorophosphate.

The amounts usually used of the initiators are from 0.005 to 50 ppm, preferably from 0.01 to 1 ppm, particularly preferably from 0.02 to 0.2 ppm, based on the monomer (mixture).

In order to terminate the polymerization, the homogeneous, liquid reaction mixture, which still comprises unconverted monomers, such as trioxane and formaldehyde, alongside polymer, is brought into contact with deactivators. These can be added in bulk form or a form diluted with an inert aprotic solvent to the polymerization mixture. The result is rapid and complete deactivation of the active chain ends.

Deactivators that can be used are those compounds which react with the active chain ends in such a way as to terminate the polymerization reaction. Examples are the organic bases triethylamine or melamine, and also the inorganic bases potassium carbonate or sodium acetate. It is also possible to use very weak organic bases, such as carboxamides, e.g. dimethylformamide. Tertiary bases are particularly preferred, examples being triethylamine and hexamethylmelamine.

The concentrations used of the bases are from 1 ppm to 1% by weight, based on the polymerization material. Concentrations of from 10 ppm to 5000 ppm are preferred.

Typical deactivation temperatures vary in the range from 125° C. to 180° C., particularly preferably in the range from 135° C. to 160° C., and very particularly preferably in the range from 140° C. to 150° C.

Typical deactivation pressures vary in the range from 3 to 100 bar, preferably from 5 to 40 bar.

The polymerization can take place in the reactors known for the preparation of POM homo- and copolymers. Typically, kneaders or extruders are used, designed to be temperature-controllable and pressure-resistant.

The phases i) and ii) are particularly preferably carried out in an assembly where a continuous transition is present between the polymerization in a heterogeneous phase and the polymerization in a substantially homogeneous phase. However, the two steps of the process can also be undertaken in different assemblies.

The deactivation of the polymerization mixture can be undertaken in a kneader or extruder, or else in a tubular reactor using static mixers.

The polymerization time can vary within a wide range and typically varies in the range from 10 seconds to 10 minutes, preferably from 15 seconds to 5 minutes, and particularly preferably from 20 to 100 seconds.

The deactivation proceeds very rapidly and is practically terminated with the mixing of the components. After the deactivation of the active chain ends, there is then no further need for capping of end groups to obtain heat-resistant polymers.

After the deactivation of the POM, it can be brought to an elevated temperature to remove unstable end groups (thermal hydrolysis), for a certain time. The liquid polymerization mixture can then be transferred into a depressurization zone, and residual monomers and solvent can be removed via application of a reduced pressure. This removal can also take place in a plurality of stages at different pressures.

The depressurization zone is formed by a space which is filled by the hot polymer solution or hot polymer melt. Application of a subatmospheric pressure, preferably of a pressure of less than 500 mbar, in particular of less than 200 mbar, drives off most of the remaining residual monomer and residual solvent from the polymer solution, utilizing the temperature of the latter. This step of the process can be carried out in a separate portion of the tubular reactor, preferably in an extruder. However, it is also possible to use other assemblies, e.g. a flash chamber. In the case of polymer solutions under pressure, these are first depressurized to ambient pressure in the depressurization zone, before the residual monomers are removed by suction.

For this, it is preferable that, after step iii), and with maintenance of the pressure, the polymer solution is transferred into an extruder in which the depressurization and the removal by suction of the monomer residues and solvent residues takes place.

It is particularly preferable to use a twin-screw extruder.

Stabilizers and processing aids (hereinafter also termed "additives") can, if appropriate, be incorporated into the POM polymer in the depressurization zone.

In one preferred variant of the inventive process, after the removal of the monomer residues and solvent residues, a mixture of additives is fed into the extruder and incorporated into the hot polyoxymethylene polymer.

Components that can be used in the mixture of additives are the compounds usually used for the stabilization and/or modification of oxymethylene polymers.

Examples of these are antioxidants, acid scavengers, formaldehyde scavengers, UV stabilizers, or heat stabilizers. The mixture of additives can comprise, alongside these, processing aids, such as adhesion promoters, lubricants, nucleating agents, mold-release agents, fillers, reinforcing materials, or antistatic agents, and also additives which give the molding composition a desired property, examples being dyes and/or pigments, and/or impact modifiers, and/or additives conferring electrical conductivity, and also mixtures of the said additives, but without any restriction of scope to the examples mentioned.

Once the monomer residues and solvent residues have been driven off in the depressurization zone, the polymer melt is solidified. This can take place during or immediately after discharge from the depressurization zone. The solidified polymer, if appropriate comprising additives, is then pelletized in a manner known per se.

An extraction stage can be used to remove remaining residual monomers and/or oligomers and/or solvents and/or other contaminants from the polymer.

Pelletization and extraction can take place in assemblies known per se.

The extraction stage is preferably followed by a drying process, in order to free the pellets from residues of adherent extractant.

The POM can then, if appropriate, in a manner known per se, be remelted, provided with additives, and repelletized. In this stage of the process, it is in particular also possible to add additives which would be dissolved out of the polymer in the extraction stage.

FIG. 1 shows one preferred variant of the inventive process.

It shows a polymerization reactor (1), a vessel for thermal hydrolysis (2) installed downstream thereof, and a devolatilizer (3).

The following are introduced into the polymerization reactor (1): by way of a monomer feed (4), a mixture composed of monomer that forms —$CH_2$—O— groups, preferably trioxane, and if appropriate a cyclic acetal, e.g. dioxolane, together with an acetal of formaldehyde, preferably methylal, and by way of a feed (5), transfer agent and initiator for cationic polymerization. The polymerization in the polymerization reactor (1) initially takes place in a heterogeneous phase, for example at a temperature of 100° C. and at a pressure from 5 to 25 bar. An increase in the polymerization temperature gradually converts the heterogeneous polymerization mixture during the course of the polymerization into a substantially homogeneous phase, in which the polymer is present in liquid form. The average residence time of the reaction mixture in the first reactor is about 60 seconds. The polymerization is then terminated by adding deactivators.

The reaction mixture is then transported into the vessel for thermal hydrolysis (2). There, the polymerization mixture is heated to 190° C. for 20 min, whereupon thermally unstable hemiacetal chain ends are removed by cleavage of formaldehyde.

In the devolatilizer (3), trioxane, monomer residues and, if appropriate, further volatile constituents are then drawn off by way of the suction system (7) from the reaction mixture. In the embodiment shown, this takes place in a plurality of stages. This apparatus allows the POM polymer to receive, although this is not shown, additives, i.e. addition of, for example, stabilizers and processing aids, further aggregates and/or reinforcing materials, and/or other additives and auxiliaries. The final product is discharged in the form of polymer melt (8) from the devolatilizer.

FIG. 1 therefore describes a preferred process which encompasses the following steps:

a) trioxane and, if appropriate, a cyclic acetal, such as dioxolane and methylal are used as initial charge in a first reactor,
b) the polymerization is carried out by adding an initiator for cationic polymerization, at pressures and temperatures such that the reaction mixture initially takes the form of a heterogeneous phase by virtue of precipitating polymer,
c) the temperature of the polymerization mixture is increased in such a way that the reaction mixture is converted into a substantially homogeneous phase,
d) a deactivator is added to the homogeneous reaction mixture, to terminate the polymerization,
e) in a second reactor, the reaction mixture is heated to temperatures such that, and for a period such that, thermal hydrolysis takes place, for example to temperatures of 190° C. for 20 min, and
f) the reaction mixture is discharged into a vented extruder, in which the deactivated and thermally hydrolyzed polymer is freed from trioxane and from other volatile components.

The inventive processes can produce oxymethylene polymers with high molecular weight and with mechanical properties adjusted as desired.

The volume melt indices of the inventively prepared oxymethylene polymers are preferably smaller than 100 ml/10 min, particularly preferably from 1.5 to 40 ml/10 min (determined to DIN EN ISO 1133 at 190° C. and with an applied weight of 2.16 kg).

The inventively prepared oxymethylene polymers can be further processed in a manner known per se by molding processes, for example by blow molding, injection molding, or extrusion, to give moldings.

The inventively prepared oxymethylene polymers feature high chemicals resistance and high heat resistance, and moldings produced therefrom exhibit exceptional impact resistance.

The examples below illustrate the invention, but do not restrict it to these embodiments.

EXAMPLES 1-3

The polymerization was carried out in a gastight, pressure-resistant twin-screw extruder with 7 separately adjustable heating stages of approximately equal length. The starting compounds were metered in by means of HPLC pumps and mixed efficiently in the premixing zone by static mixing elements, before they passed onward for polymerization in the extruder.

4 kg/h of trioxane preheated to 80° C. and 4 g/h of methylal in which 300 ppm of trifluoromethanesulfonic acid and 600 ppm of triethylammonium triflate had been dissolved, were pumped into the extruder while the screw rotation rate was 120 rpm. The pressure was kept constant at 18 bar by a pressure-retention valve at the end of the extruder. The temperature profiles for individual examples are shown in table 1. The residence time in the extruder was about 1 min. The polymers were discharged in the form of melt and collected in a receiver. After cooling, polymer specimens were dissolved in boiling dimethylacetamide (=DMAc), and boiled for about 1 h, to remove unstable chain ends. The polymers precipitated after cooling were boiled twice in methanol, filtered, and dried. Image 1 shows the molecular weight distribution of the polymers from example 1 to 3.

TABLE 1

| Example No. | Temp. Zone 1 | Temp. Zone 2 | Temp. Zone 3 | Temp. Zone 4 | Temp. Zone 5 | Temp. Zone 6 | Temp. Zone 7 |
|---|---|---|---|---|---|---|---|
| 1 | 100 | 110 | 125 | 140 | 150 | 170 | 170 |
| 2 | 110 | 120 | 135 | 150 | 160 | 170 | 170 |
| 3 | 120 | 130 | 145 | 160 | 170 | 170 | 170 |

Temperature data (Temp.) are in ° C.

FIG. 2 shows the GPC curves of the polymers from examples 1-3. The polymer of example 1 corresponds here to curve (1); the polymer of example 2 corresponds to curve (2); the polymer of example 3 corresponds to curve (3).

What is claimed is:

1. A process for the preparation of oxymethylene polymers via polymerization of at least one monomer that forms —$CH_2$—O— units, if appropriate in combination with at least one comonomer copolymerizable therewith having at least one C—C bond, and also in the presence of a chain transfer agent and of an initiator for cationic polymerization, which comprises carrying out the polymerization in a first phase in a heterogeneous polymerization mixture and, following this, carrying out further polymerization in a second phase in a homogeneous polymerization mixture, and wherein, at the end of the second phase polymerization, a deactivator is added for terminating polymerization, wherein from about 10% to about 70% of the monomer is converted to the oxymethylene polymer during the first phase heterogeneous polymerization.

2. The process as claimed in claim 1, wherein the phase transition between first and second phase takes place via an increase in the temperature.

3. The process as claimed in claim 1, which encompasses the following measures:
   i) polymerization of a monomer that forms —$CH_2$—O— units and which, if appropriate, comprises a cyclic acetal, in the presence of an acetal of formaldehyde and of an initiator for cationic polymerization, where the temperature of the polymerization mixture is so low that solid polymer is present alongside liquid monomer at the beginning of the polymerization,
   ii) raising of the temperature during the course of the polymerization sufficiently far that a substantially homogeneous polymer melt is present at the end of the polymerization alongside remaining residual monomers,
   iii) deactivation of the active polymer chains in a homogeneous phase, in that the polymer melt is brought into contact with a deactivator, and
   iv) direct further processing of the resultant melt via degradation of the unstable chain ends and devolatilization of the polymer melt.

4. The process as claimed in claim 1, wherein, at least in the second phase, the polymerization is carried out under elevated pressure, so that no gas phase can form.

5. The process as claimed in claim 4, wherein the first and second phase of the polymerization are carried out in a reactor which permits the generation of a superatmospheric pressure in the interior of the reactor during continuous introduction of reactants into the reactor and discharge of materials from the reactor, and which possesses a plurality of heatable zones.

6. The process as claimed in claim 5, wherein the reactor is an externally sealed extruder or kneader.

7. The process as claimed in claim 1, wherein the polymerization takes place in the first phase at temperatures of from 60° C. to 140° C. and in the second phase at temperatures above 150° C.

8. The process as claimed in claim 1, wherein, during the polymerization, no monomers from the polymerization mixture transfer into a gas phase.

9. The process as claimed in claim 1, wherein the polymerization is carried out in both phases at pressures of from 2 to 50 bar, preferably from 5 bar to 25 bar.

10. The process as claimed in claim 1, wherein the polymerization mixture is, after deactivation, subjected at an elevated temperature to a thermal hydrolysis of the unstable end groups and to a devolatilization.

\* \* \* \* \*